June 30, 1970
T. H. FIKSE
3,517,945
TRAILER INCLUDING DETACHABLE GOOSENECK
Filed April 3, 1968
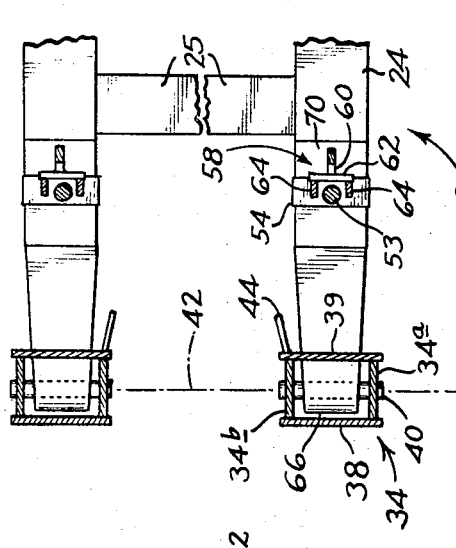
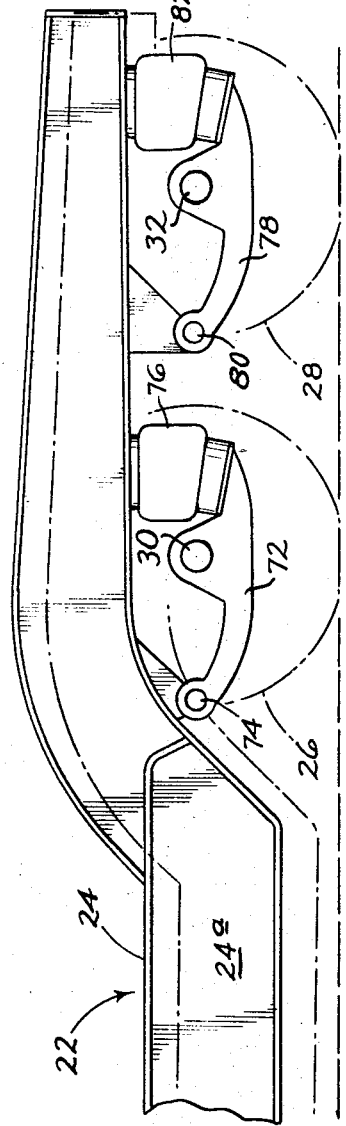
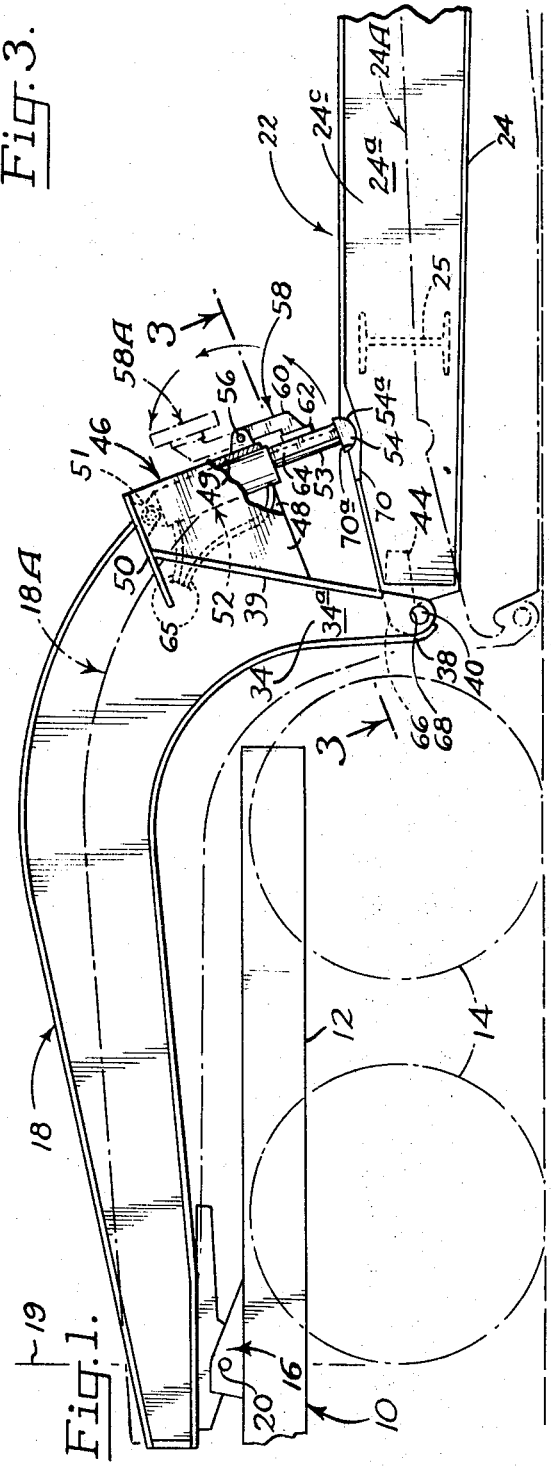
Tyman H. Fikse
INVENTOR
BY
Kolisch & Hartwell
Attys.

United States Patent Office 3,517,945
Patented June 30, 1970

3,517,945
TRAILER INCLUDING DETACHABLE
GOOSENECK
Tyman H. Fikse, Enumclaw, Wash., assignor to Page &
Page, a division of Dura Corporation, Oak Park, Mich.,
a corporation of New York
Filed Apr. 3, 1968, Ser. No. 718,548
Int. Cl. B62d 53/06
U.S. Cl. 280—425
5 Claims

ABSTRACT OF THE DISCLOSURE

Apparatus for detachably connecting the forward end of a trailer frame and a gooseneck including a pair of opposed pins on the gooseneck, a pair of opposed hooks on the trailer frame adapted releasably to seat on and rotate about the pins, to accommodate relative rocking of the gooseneck, and a pair of opposed rams with cylinders secured to the gooseneck and disposed so that upon extension their rod ends bear downwardly on the trailer frame whereby the gooseneck is swung forwardly with respect to the frame and the mass of the frame is effective to hold the gooseneck and frame together.

---

This invention relates to a trailer, more particularly to apparatus for detachably connecting the end of a trailer frame to a gooseneck. The preferred embodiment of the invention is described herein in connection with what is frequently referred to as a "lowboy" type trailer, featuring an elongated, flatbed frame and a gooseneck provided at one end of such flatbed frame used in coupling the trailer to a truck or tractor.

A trailer of the type mentioned often is employed to haul large pieces of equipment, such as a crane, bulldozer, etc. To facilitate loading and unloading of the trailer, the gooseneck which is ordinarily used to tow the trailer is detached from the trailer frame and the frame lowered, which enables a load to be moved over the end of the trailer frame. This invention generally features, as an object of the invention, improved means for coupling the gooseneck and trailer frame together, which does not require special tools, and which enables coupling and uncoupling to be done relatively easily in a short amount of time.

More specifically, an object of the invention is to provide apparatus for detachably connecting the gooseneck of a trailer to a trailer frame which includes first and second catch means on the trailer frame and gooseneck, respectively, which are releasably interengageable to produce a rockable connection between the gooseneck and frame, and a fluid-operated ram mounted in an elevated position on the gooseneck. The latter is operable, on extension, to bear down upon the trailer frame, with the gooseneck as a consequence swinging forwardly about such rockable connection. With the forward end of the gooseneck disposed at an elevated position, i.e., supported on the fifth wheel connection of the usual truck or tractor, such forward shifting of the gooseneck is effective to elevate the forward end of the trailer frame and to lock together the gooseneck and trailer frame.

It is preferred that the fluid under pressure for operating the ram described be supplied from the usual source of pressure fluid found on a conventional truck and utilized in operating other fluid-powered instrumentalities on the truck. The cylinder of the fluid-operated ram is mounted on the gooseneck, with the fluid to power the ram being delivered in the usual manner to the cylinder. The ram's opposite ends, i.e., its rod end, need only contact the trailer frame by bearing down upon it when extended, and requires no actual secured connection with the trailer frame. With this organization, and upon uncoupling of the gooseneck from the trailer frame, to completely separate the gooseneck and the trailer frame requires no uncoupling of hydraulic connections with the ram. Any system for supplying pressure fluid to the ram which previously has been established remains intact.

With the ram supported in an elevated position over the trailer frame and on the gooseneck, the ram may approximately parallel the contour of the gooseneck where the gooseneck arches downwardly to its point of joinder with the trailer frame. A ram having a relatively long stroke may be selected, with such spaced a proper distance from the rock axis established between the gooseneck and trailer frame to provide the necessary leverage to produce forward rocking of the gooseneck on extension of the ram. This is all accomplished without substantial cluttering of the space at the forward end of the trailer frame. Because good leverage is obtainable, the pressure of the fluid needed to operate the ram to produce extension may be maintained at a reasonably low level.

In a preferred embodiment of the invention, a fluid-operated ram of the type described is provided adjacent each of the opposite sides of the trailer, each ram coacting with an associated rockable connection established between the gooseneck and trailer frame to produce a reliable locked connection on extension of the ram.

These and other objects and advantages are attained by the invention, which will become more fully apparent as the description which follows is read in conjunction with the accompanying drawings, wherein:

FIG. 1 is a fragmentary side elevation, illustrating the forward end of a lowboy-type trailer, including a trailer frame forming a flatbed in the trailer which is connected according to the invention to a gooseneck;

FIG. 2 is a fragmentary side elevation, illustrating the rear end of the trailer frame in FIG. 1; and FIG. 3 is a cross-sectional view taken generally along the line 3—3 in FIG. 1.

Turning now to the drawings, and referring first to FIG. 1, indicated generally and in somewhat simplified form at 10 is the rear portion of a conventional truck or tractor of the type employed to tow a trailer over the highway. Such tractor includes the usual frame 12 supported for movement over the ground by means of wheel assemblies, such as those indicated in dot-dashed outline at 14. Mounted on the trailer frame through a conventional fifth wheel assembly 16 is a gooseneck 18 of a trailer generally designated at 22. The fifth wheel assembly permits the gooseneck to turn about a substantially upright axis 19, and also to rock to a limited degree about a substantially horizontal axis afforded by pivot connection 20.

Referring now both to FIGS. 1 and 2, the trailer includes an elongated trailer frame 24 extending rearwardly of the gooseneck. Such is formed of a pair of elongated, laterally spaced and substantially parallel side members or longitudinals 24a, joined by transverse members, such as the one shown in dotted outline in FIG. 1 at 25, distributed along the length of longitudinals 24a. The forward end of the trailer frame is detachably coupled to the gooseneck by a means to be described and the rear end of the trailer frame is supported for movement over the ground through wheel assemblies, such as assemblies 26, 28 shown in dot-dashed outline in FIG. 2, carried on axles 30, 32, respectively.

Describing now in greater detail the means provided for coupling the gooseneck and trailer frame together, adjacent the rear and on each side of the gooseneck is a downwardly depending arm 34. Such is formed from opposed side plates 34a, 34b (see FIG. 3), which are joined along their forward margins by means of a plate, such as plate 38, and along their rear margins by means of a plate, such as plate 39.

Suitably mounted on an arm, and extending between pairs of plates 34a, 34b, is a pin, or what is referred to as a catch means 40. The pins for the two arms of the gooseneck are in horizontal alignment, and provide a rock axis shown at 42. Joined to inner plate 34b of an arm is an elongated, rearwardly extending guide ear, exemplified by the ear shown at 44. As most clearly shown in FIG. 3, the guide ear occupies an upright plane which is slightly inclined with respect to the plane of inner plate 34b.

Disposed to the rear and mounted on each of the depending arms is a hollow housing, such as the one generally indicated at 46 in FIG. 1. The housing is formed of a pair of laterally spaced-apart, opposed side plates 48, extending rearwardly of and joined to plate 39 in the arm, a rear plate 49, and a plate 50 which closes off the top of the housing. The bottom of the housing is open.

Mounted within the housing 46 provided at the rear of each arm 34 is a fluid-operated ram, such as the hydraulic ram shown generally at 52 in FIG. 1. This ram has its cylinder end connected by pivot connection 51 to plate 50 of the housing. This pivot connection has a construction which affords only limited pivotal movement of the ram, to accommodate the slight movement required when the same is extended in the coupling of the gooseneck to the trailer frame. The ram is maintained by the connection in a position approximately paralleling plate 49.

A rod 53 in the ram extends downwardly through the open bottom of the housing, and the lower end of the rod carries a shoe 54. This shoe has a downwardly facing semi-cylindrical bearing surface 54a.

Mounted on plate 49 of the housing, through a pivot connection 56, is means 58 for limiting mechanically contraction of ram 52. More specifically, this means includes an elongated arm 60 extending from pivot connection 56 to a free end which is joined to one face of a plate 62. A pair of laterally spaced parallel bars 64 are mounted on plate 62, the spacing of these bars being somewhat greater than the outer diameter of rod 53.

With device 58 in the position shown in solid outline in FIG. 1, bars 64 straddle rod 53, and have upper ends adjacent the bottom of the ram cylinder and lower ends adjacent the top of bearing shoe 54. In this position, the bars perform a safety function in preventing sudden collapse of the ram in the event that there should be an inadvertent loss of pressure fluid. Means 58 is easily swung upwardly and out of the way to the position shown in dot-dashed outline at 58a, after first extending the ram slightly to free bars 64 from any pressure exerted thereon by the upper side of shoe 54.

Hoses for the supply and exhaust of pressure fluid to opposite ends of the cylinder in ram 52 are partially shown at 65. While a double-acting ram 52 is illustrated, with hose connections to opposite ends of the ram cylinder, alternatively a single-acting ram may be employed. It should be understood, and when in operative condition, that hoses 65 have their opposite extremities connected to the usual source of fluid under pressure provided in the truck. It will be noted that with the organization contemplated, the part that receives the hydraulic fluid causing ram actuation, namely the ram cylinder, is permanently connected to the gooseneck, and thus on separation of the gooseneck from the trailer frame, there is no requirement that there be any interruption of the system already established for supplying pressure fluid through hoses 65 to the ram.

Considering now the construction of the forward end of the trailer frame, each side member or longitudinal 24a in the trailer frame terminates in a hook, or another catch means, such as hooks 66 illustrated. This hook is shaped freely to be received between the pairs of plates 34a, 34b supporting pin 40 in an arm of the gooseneck. In coupling the gooseneck to the trailer, the hook is adapted to be dropped over the top of a pin 40 with downwardly facing arcuate surface 68 in the hook then becoming supported on the pin. The hook and pin constitute separable coupling mechanism producing a draft-transmitting connection between the gooseneck and trailer frame with the hook over the pin as shown in FIG. 1. The hook and pin are relatively vertically displaceable to disengage one from the other, thus to separate the coupling mechanism.

Each side member 24a in the trailer frame also is provided with a bearing block, such as that shown at 70, spaced somewhat to the rear of hook 66. This block is provided with a recess or socket defined by an upwardly facing semi-cylindrical bearing surface, such as the one shown 70a. This bearing surface approximately matches in curvature the curved bearing surface of shoe 54 carried at the base of rod 53.

Considering briefly the construction for supporting the rear of the trailer, and referring to FIG. 2, an air suspension system may be provided in the mounting of axles 30, 32. The suspension system for axle 30 includes an arm 72 mounted through pivot connection 74 on the trailer frame, and biased downwardly by an air bag 76. In the case of axle 32, the air suspension system includes an arm 78 similarly pivoted at 80 to the frame, and biased downwardly by an air bag 82.

In FIG. 1 the trailer is shown with the trailer frame and gooseneck coupled together and with the forward end of the trailer frame somewhat elevated above ground level. Explaining the operation of the apparatus described, to uncouple the gooseneck from the trailer frame, arm 60 associated with each ram is first swung upwardly to its raised position, to permit free contraction of the ram. The rams on opposite sides of the trailer are then contracted, which is accompanied with dropping of the front end of the trailer frame to the ground. With the forward end of the trailer frame on the ground, and on further lowering of the rear of the gooseneck, pins 40 carried at the extremities of opposed arms 34 move downwardly and clear of hooks 66 at the forward extremities of trailer longitudinals 24. The gooseneck may then be completely separated from the trailer frame by driving the tractor forwardly. To couple the gooseneck and trailer, the tractor is backed toward the trailer frame to move the pins under the hooks at the end of the trailer longitudinals. With subsequent extension of rams 52, the shoes at the extremities of the rods in these rams seat within the sockets defined within blocks 70, and on further extension of the rams the gooseneck is rocked forwardly about rock axis 42 with raising of the forward end of the trailer frame.

It will be noted that in the organization, rams 52 are substantially upright and approximately follow the profile of the gooseneck where it arches downwardly to meet the trailer frame. Being upright, rams having a substantial stroke may be utilized, and these rams coact with the bearing blocks at locations spaced a substantial distance from rock axis 42. As a consequence, there is relatively little cluttering of the space at the forward end of the trailer frame. The pressure of the fluid pressure needed to actuate the rams need not be excessive.

No special tools are required in the uncoupling operation. Furthermore, uncoupling and coupling may be done relatively rapidly.

While an embodiment of the invention has been described herein, it is appreciated that variations and modifications may be made without departing from the invention. Accordingly, it is desired to cover all such variations and modifications as would be apparent to those skilled in the art and that come within the scope of the appended claims.

It is claimed and desired to secure by Letters Patent:

1. In a trailer including a trailer frame and a gooseneck, apparatus detachably connecting one end of the frame to the gooseneck comprising draft transmitting separable coupling mechanism including catch means on the trailer frame and interengaged catch means on the gooseneck producing when so interengaged a draft transmitting connection between the gooseneck and trailer frame, said catch means on the gooseneck and frame being relatively vertically displaceable away from each other to disengage one catch means from the other, thus to separate the coupling mechanism, the catch means on the trailer and the catch means on the gooseneck when interengaged producing a rocking connection between the gooseneck and trailer frame affording relative movement of the gooseneck about a rock axis extending transversely of the trailer, a fluid-operated extensible-contractible device disposed in an extended condition above the trailer and having one end connected to the gooseneck, means on the gooseneck for supplying and exhausting pressure fluid to said device, and bearing means on the trailer frame spaced laterally from said rock axis and beneath said device engaged by the opposite end of said device.

2. The apparatus of claim 1, wherein said extensible device comprises a fluid-operated ram including a cylinder forming one end and an extensible rod forming the other end, and its cylinder end is connected to the gooseneck.

3. The apparatus of claim 2 which further comprises means for limiting contraction of the ram through mechanically holding said rod in the ram extended.

4. The apparatus of claim 2, wherein said ram is mounted in an upright position, with its rod projecting downwardly from said cylinder, and the bearing means comprises a socket spaced toward the opposite end of the trailer frame from said rock axis.

5. The apparatus of claim 4, wherein the rod of the ram includes an end bearing member removably seated within said socket, and which further comprises means interposed between the ram's cylinder and said bearing member limiting contraction of the ram.

References Cited

UNITED STATES PATENTS

| | | | |
|---|---|---|---|
| 2,844,265 | 7/1958 | Clark | 280—423 X |
| 2,953,396 | 9/1960 | Meadows | 280—423 |
| 3,027,030 | 3/1962 | Duffy | 280—423 X |
| 3,429,585 | 2/1969 | Ross | 280—423 |

LEO FRIAGLIA, Primary Examiner

U.S. Cl. X.R.

214—505